United States Patent
Chandra et al.

(10) Patent No.: US 8,401,036 B2
(45) Date of Patent: Mar. 19, 2013

(54) QUALITY OF SERVICE BASED RESOURCE DETERMINATION AND ALLOCATION APPARATUS AND PROCEDURE IN HIGH SPEED PACKET ACCESS EVOLUTION AND LONG TERM EVOLUTION SYSTEMS

(75) Inventors: Arty Chandra, Manhasset Hills, NY (US); Jin Wang, Central Islip, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1219 days.

(21) Appl. No.: 11/669,425

(22) Filed: Jan. 31, 2007

(65) Prior Publication Data

US 2007/0189235 A1    Aug. 16, 2007

Related U.S. Application Data

(60) Provisional application No. 60/838,318, filed on Aug. 17, 2006, provisional application No. 60/765,078, filed on Feb. 3, 2006.

(51) Int. Cl.
*H04J 3/16* (2006.01)
*H04J 3/22* (2006.01)

(52) U.S. Cl. ........ 370/469; 370/229; 370/230; 370/338; 370/468

(58) Field of Classification Search .................. 370/335, 370/469, 229, 230, 338, 468
See application file for complete search history.

(56) References Cited

U.S. PATENT DOCUMENTS

| | | | |
|---|---|---|---|
| 6,728,298 B1 | 4/2004 | Okubo et al. | |
| 7,266,096 B2 * | 9/2007 | Miya et al. | 370/322 |
| 7,505,397 B2 | 3/2009 | Lee et al. | |
| 7,631,247 B2 | 12/2009 | Petrovic et al. | |
| 7,756,080 B2 | 7/2010 | Sebire et al. | |
| 2002/0075867 A1* | 6/2002 | Herrmann | 370/389 |
| 2003/0119452 A1 | 6/2003 | Kim et al. | |
| 2004/0171359 A1 | 9/2004 | Tirkkonen et al. | |
| 2005/0094586 A1 | 5/2005 | Zhang et al. | |
| 2005/0160154 A1* | 7/2005 | Raciborski et al. | 709/219 |

(Continued)

FOREIGN PATENT DOCUMENTS

| EP | 1 551 202 | 7/2005 |
|---|---|---|
| EP | 1551202 | 7/2005 |

(Continued)

OTHER PUBLICATIONS

ETSI TS 125 321 V6.7.0, Dec. 2005.*

(Continued)

*Primary Examiner* — Ajit Patel
(74) *Attorney, Agent, or Firm* — Volpe and Koenig, P.C.

(57) ABSTRACT

A wireless transmit receive unit (WTRU) and method are provided that process communication data in a hierarchy of processing layers including a physical (PHY) layer, a medium access control (MAC) layer and higher layers. A MAC layer transport format selection device defines an assignment of higher layer transmission data to parallel data streams based on data characteristics received from higher layers and physical resource information received from the PHY layer. The transport format selection also device generates transport format parameters for each data stream. A multiplexer component multiplexes the transmission data onto the parallel data streams in transport blocks in accordance with the data stream assignment and the respective transport format parameters generated by the transport format selection device and outputs the selectively multiplexed transmission data to the PHY layer for transmission over respective physical resource partitions. Preferably, the transport format selection device also generates physical transmission attributes such as modulation and coding rate (MCR), number of subframes per transmission time interval (TTI), duration of TTI, transmission power and hybrid automatic repeat request (HARQ) parameters.

26 Claims, 3 Drawing Sheets

U.S. PATENT DOCUMENTS

| | | | |
|---|---|---|---|
| 2005/0243762 A1 | | 11/2005 | Terry et al. |
| 2007/0064949 A1 | * | 3/2007 | Choi et al. ............... 380/270 |
| 2007/0253366 A1 | | 11/2007 | Gabin et al. |

FOREIGN PATENT DOCUMENTS

| | | | |
|---|---|---|---|
| EP | 1551202 A2 | * | 7/2005 |
| GB | 2415868 | | 1/2006 |
| JP | 2001-168821 | | 6/2001 |
| KR | 1020050018050 | * | 2/2005 |
| WO | 2005/122528 | | 12/2005 |
| WO | 2005/125107 | | 12/2005 |

OTHER PUBLICATIONS

ETSI TS 125 309 V6.5.0, Dec. 2005.*
"Universal Mobile Telecommunications System (UMTS); FDD enhanced uplink; Overall description; Stage 2 (3GPP TS 309 V6.5.0 Release 6)," ETSl TS 125 309 V6.5.0 (Dec. 2005).
"Universal Mobile Telecommunications System (UMTS); Medium Access Control (MAC) protocol specification (3GPP TS 25.321 V6.7.0 Release 6)," ETSI TS 125 321 V6.7.0 (Dec. 2005).
Dahlman et al., "The Long Term Evolution of 3G," Ericsson Review, No. 2, pp. 118-125, XP001540709 (2005).
Ericsson et al., "Link Adaptation for E-UTRA Downlink—Text Proposal for TR 25.814," TSG-RAN WG1 LTE Ad Hoc Meeting, R1-060102 (Jan. 23-25, 2006).
Haberland et al., "3G Evolution Towards High Speed Dowlink Packet Access," Alcatel Telecommunications Review, XP007009490 (Oct. 2003).
Motorola, "HARC Considerations," 3GPP TSG RAN WG2 #50, R2-060124 (Jan. 9-13, 2006).
Motorola, "MAC Architecture and Physical Layer Models," 3GPP TSG RAN WG2 #50, R2-060123 (Jan. 9-13, 2006).
Third Generation Partnership Project, "Technical Specification Group Radio Access Network; Multiplexing and channel coding (TDD) (Release 1999)," 3GPP TS 25.222 V3. 10.0 (Sep. 2002).
Third Generation Partnership Project, "Technical Specification Group Radio Access Network; Multiplexing and channel coding (TDD) (Release 4)," 3GPP TS 25.222 V4.8.0 (Sep. 2004).
Third Generation Partnership Project, "Technical Specification Group Radio Access Network; Multiplexing and channel coding (TDD) (Release 5)," 3GPP TS 25.222 V5.7.0 (Sep. 2004).
Third Generation Partnership Project, "Technical Specification Group Radio Access Network; Multiplexing and channel coding (TDD) (Release 6)," 3GPP TS 25.222 V6.2.0 (Dec. 2004).
Third Generation Partnership Project, "Technical Specification Group Radio Access Network; Multiplexing and channel coding (TDD) (Release 7)," 3GPP TS 25.222 V7.1.0 (Sep. 2006).
Third Generation Partnership Project, "Technical Specification Group Radio Access Network; Physical layer aspects for evolved Universal Terrestrial Radio Access (UTRA) (Release 7)," 3GPP TR 25.814, V7.0.0 (Sep. 2006).
Third Generation Partnership Project, "Technical Specification Group Radio Access Network; Physical layer aspects for evolved Universal Terrestrial Radio Access (UTRA) (Release 7)," 3GPP TR 25.814, V1.0.1 (Nov. 2005).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release x)," 3GPP TS 36.300, V0.1.0 (Oct. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V0.3.1 (Nov. 2006).
Third Generation Partnership Project, "Technical Specification Group Radio Access Network; Physical Channels and Modulation (Release 8)," 3GPP TS 36.211 V0.2.2 (Dec. 2006).
Third Generation Partnership Project, "Technical Specification Group Radio Access Network; Physical channels and mapping of transport channels onto physical channels (FDD) (Release 7)," 3GPP TS 25.211 V7.0.0 (Mar. 2006).
Third Generation Partnership Project, "Technical Specification Group Radio Access Network; Physical channels and mapping of transport channels onto physical channels (FDD) (Release 6)," 3GPP TS 25.211 V6.7.0 (Dec. 2005).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
"Universal Mobile Telecommunications System (UMTS); FDD enhanced uplink; Overall description; Stage 2 (3GPP TS 309 V6.5.0 Release 6)," ETSI TS 125 309 V6.5.0 (Dec. 2005).
Motorola, " HARC Considerations," 3GPP TSG RAN WG2 #50, R2-060124 (Jan. 9-13, 2006).
Third Generation Partnership Project, "Technical Specification Group Radio Access Network; Multiplexing and channel coding (TDD) (Release 1999)," 3GPP TS 25.222 V3.10.0 (Sep. 2002).
Third Generation Partnership Project, "Technical Specification Group Radio Access Network; Physical layer aspects for evolved Universal Terrestrial Radio Access (UTRA) (Release 7)," 3GPP TR 25.814, V7.1.0 (Sep. 2006).
Third Generation Partnership Project, "Technical Specification Group Radio Access Network; Phusical Channels and Modulation (Release 8)," 3GPP TS 36.211 V0.2.2. (Dec. 2006).
"Universal Mobile Telecommunications System (Umts); Fdd enhanced uplink; Overall description; Stage 2 (3GPP TS 25.321 V6.7.0 Release 6)," ETSI TS 125 321 V6.7.0 (Dec. 2005).
Ericsson et al., "Link Adaptation for E-UTRA Downlink — Text Proposal for TR 25.814," TSG-RAN WG1 LTE Ad Hoc Meeting, R1-060102 (Jan. 23-25, 2006).
Motorola, "MAC Architecture and Physical Layer Models," 3GPP TSG RAN WG2 #50, R2-060123.(Jan. 9-13, 2006).

* cited by examiner

QUALITY OF SERVICE BASED RESOURCE DETERMINATION AND ALLOCATION APPARATUS AND PROCEDURE IN HIGH SPEED PACKET ACCESS EVOLUTION AND LONG TERM EVOLUTION SYSTEMS

CROSS REFERENCE TO RELATED APPLICATIONS

This application claims priority from U.S. Provisional Patent Application No. 60/838,318 filed on Aug. 17, 2006 and U.S. Provisional Patent Application No. 60/765,078 filed on Feb. 3, 2006, which are incorporated by reference as if fully set forth.

FIELD OF THE INVENTION

The present invention is related to the medium access control (MAC) design of high speed packet access evolution (HSPA+), and long term evolution (LTE) systems. More particularly, the present invention is related to a method and apparatus for assigning physical resources and transport format attributes to a plurality of parallel data streams according to quality of service (QoS) requirements of data to be transmitted in a common transmission time interval (TTI).

BACKGROUND OF THE INVENTION

Wireless communication systems are well known in the art. Communications standards are developed in order to provide global connectivity for wireless systems and to achieve performance goals in terms of, for example, throughput, latency and coverage. One current standard in widespread use, called Universal Mobile Telecommunications Systems (UMTS), was developed as part of Third Generation (3G) Radio Systems, and is maintained by the Third Generation Partnership Project (3GPP).

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit receive units (WTRUs), referred to as user equipments (UEs) in the 3GPP standard, via a Uu radio interface. A commonly employed air interface defined in the UMTS standard is wideband code division multiple access (W-CDMA). The UTRAN has one or more radio network controllers (RNCs) and base stations, referred to as Node Bs by 3GPP, which collectively provide for the geographic coverage for wireless communications with UEs. One or more Node Bs is connected to each RNC via an Iub interface; RNCs within a UTRAN communicate via an Iur interface.

The Uu radio interface of a 3GPP system uses Transport Channels (TrCHs) for transfer of user data and signaling between UEs and Node Bs. In 3GPP communications, TrCH data is conveyed by one or more physical channels defined by mutually exclusive physical resources, or shared physical resources in the case of shared channels. TrCH data is transferred in sequential groups of Transport Blocks (TBs) defined as Transport Block Sets (TBSs). Each TBS is transmitted in a given Transmission Time Interval (TTI) which may span a plurality of consecutive system time frames. For example, according to the 3GPP UMTS Release '99 (R99) specification, a typical system time frame is 10 microseconds and TTIs are specified as spanning 1, 2, 4 or 8 of such time frames. According to high speed downlink packet access (HSDPA), an improvement to the UMTS standard part of Release 5 specifications, and high speed uplink packet access (HSUPA), part of Release 6 specifications, TTIs are typically 2 ms and therefore are only a fraction of a system time frame.

The processing of TrCHs into a Coded Composite TrCH (CCTrCH) and then into one or more physical channel data streams is explained, for example, with respect to time division duplex (TDD) communications in 3GPP TS 25.222. Starting with the TBS data, Cyclic Redundancy Check (CDC) bits are attached and Transport Block concatenation and Code Block segmentation is performed. Convolution coding or turbo coding is then performed, but in some instances no coding is specified. The steps after coding include radio frame equalization, a first interleaving, radio frame segmentation and rate matching. The radio frame segmentation divides the data over the number of frames in the specified TTI. The rate matching function operates by means of bit repetition or puncturing and defines the number of bits for each processed TrCH which are thereafter multiplexed to form a CCTrCH data stream.

In a conventional 3GPP system, communications between a UE and a node B are conducted using a single CCTrCH data stream, although the node B may be concurrently communicating with other UEs using respective other CCTrCH data streams.

The processing of the CCTrCH data stream includes bit scrambling, physical channel segmentation, a second interleaving and mapping onto one or more physical channels. The number of physical channels corresponds to the physical channel segmentation. For uplink transmissions, UE to Node B, the maximum number of physical channels for transmission of a CCTrCH is currently specified as two. For downlink transmissions, Node B to UEs, the maximum number of physical channels for transmission of a CCTrCH is currently specified as sixteen. Each physical channel data stream is then spread with a channelization code and modulated for over air transmission on an assigned frequency.

In the reception/decoding of the TrCH data, the processing is essentially reversed by the receiving station. Accordingly, UE and Node B physical reception of TrCHs require knowledge of TrCH processing parameters to reconstruct the TBS data. For each TrCH, a Transport Format Set (TFS) is specified containing a predetermined number of Transport Formats (TFs). Each TF specifies a variety of dynamic parameters, including TB and TBS sizes, and a variety of semi static parameters, including TTI, coding type, coding rate, rate matching parameter and CRC length. The predefined collection of TFSs for the TrCHs of a CCTrCH for a particular frame is denoted as a Transport Format Combination (TFC). For each UE a single TFC is selected per TTI so that there is one TFC processed per TTI per UE.

Receiving station processing is facilitated by the transmission of a Transport Format Combination Indicator (TFCI) for a CCTrCH. For each TrCH of a particular CCTrCH, the transmitting station determines a particular TF of the TrCH's TFS which will be in effect for the TTI and identifies that TF by a Transport Format Indicator (TFI). The TFIs of all the TrCHs of the CCTrCH are combined into the TFCI. For example, if two TrCHs, TrCH1 and TrCH2, are multiplexed to form CCTrCH1, and TrCH1 has two possible TFs, TF10 and TF11, in its TFS and TrCH2 has four possible TFs, TF20, TF21, TF22, and TF23, in its TFS, valid TFCIs for CCTrCH1 could include (0,0), (0,1), (1,2) and (1,3), but not necessarily all possible combinations. Reception of (0,0) as the TFCI for CCTrCH1 informs the receiving station that TrCH1 was formatted with TF10 and TrCH2 was formatted with TF20 for the received TTI of CCTrCH1; reception of (1,2) as the TFCI for CCTrCH1 informs the receiving station that TrCH1 was formatted with TF11 and TrCH2 was formatted with TF22 for the received TTI of CCTrCH1.

In UMTS specification releases 5 and 6 pertaining to HSDPA and HSUPA, respectively, fast retransmissions are accomplished according to hybrid automatic repeat request (HARQ). There it is currently specified that only one hybrid automatic repeat request (HARQ) process is used per TTI.

High speed packet access evolution (HSPA+) and universal terrestrial radio access (UTRA) and UTRAN long term evolution (LTE) are part of a current effort lead by 3GPP towards achieving high data-rate, low-latency, packet-optimized system capacity and coverage in UMTS systems. In this regard, both HSPA+ and LTE are being designed with significant changes to existing 3GPP radio interface and radio network architecture. For example, in LTE, it has been proposed to replace code division multiple access (CDMA) channel access, used currently in UMTS, by orthogonal frequency division multiple access (OFDMA) and frequency division multiple access (FDMA) as air interface technologies for downlink and uplink transmissions, respectively. The air interface technology proposed by HSPA+ is based on code division multiple access (CDMA) but with a more efficient physical (PHY) layer architecture which can include independent channelization codes distinguished with respect to channel quality. Both the LTE and HSPA+ are being designed for multiple-input multiple-output (MIMO) communications physical layer support. In such new systems, multiple data streams can be used for communications between a UE and a Node B.

The inventors have recognized that the existing 3GPP medium access control (MAC) layer procedures are not designed to deal with the new PHY layer architectures and features of the proposed systems. TFC selection in the current UMTS standard does not take into account some of the new transport format (TF) attributes introduced by LTE and HSPA+ including, but not limited to, time and frequency distribution and number of subcarriers in LTE, channelization codes in HSPA+, and different antenna beams in the case of MIMO.

According to the MAC procedures defined in the current UMTS standard, data multiplexed into transport blocks is mapped to a single data stream at a time, such that only one transport format combination (TFC) selection process is required to determine the necessary attributes for transmission over the physical channel starting at a common transmission time interval (TTI) boundary. Accordingly, only one hybrid automatic repeat request (HARQ) process, which controls data retransmissions for error correction, is allocated for any given UE-Node B communication. According to the proposed PHY layer changes for HSPA+ and UMTS described above, for a given UE-Node B communication, multiple physical resource groups may be available simultaneously for data transmissions, resulting in potentially multiple data streams to be transmitted for the communication.

The inventors have recognized that, starting at a common TTI boundary, multiple data streams may each have common or different quality of service (QoS) requirements, requiring specialized transmission attributes, such as modulation and coding, and different hybrid automatic repeat request (HARQ) processes. By way of example, in the case of multiple-input multiple-output (MIMO) communications, independent data streams can be transmitted simultaneously because of spatial diversity; however, each spatially diverse data stream requires its own transmission attributes and HARQ process to meet its desired QoS requirements because of different channel characteristics. There are currently no MAC methods or procedures to assign attributes to multiple data streams simultaneously and to effectively provide equal or unequal QoS to parallel data streams.

The inventors have developed a method for selecting multiple transport formats in parallel according to channel quality measurements and QoS requirements that exploits the new PHY layer attributes and features of HSPA+ and LTE systems.

SUMMARY

The present invention provides a method and apparatus for transport format combination (TFC) selection in a medium access control (MAC) layer to deal with changes proposed by high speed packet access evolution (HSPA+) and long term evolution (LTE) systems including physical layer structure and attributes, dynamic resource allocation, transmission schemes becoming MIMO, and multiple QoS requirements. A method is provided for running multiple TFC selection procedures simultaneously to assign transmission attributes to parallel data streams satisfying the quality of service (QoS) requirements of the data according to the physical channel characteristics. The present invention supports the transmission of a plurality of data streams on a common transmission time interval (TTI) boundary with either normalized or differentiated QoS via the parallel TFC selection functions. Substantial changes are introduced to the previous 3GPP TFC selection procedure, defined in the high speed downlink packet access (HSDPA) and high speed uplink packet access (HSUPA) protocols which address new features in HSPA+ and LTE systems as described above. The present invention readily provides for dynamic hybrid automatic repeat request (HARQ) process assignment when different HARQs are applicable to the data streams.

For a preferred embodiment, a wireless transmit receive unit (WTRU), that includes a receiver and a transmitter, and method are provided that process communication data in a hierarchy of processing layers including a physical (PHY) layer, a medium access control (MAC) layer and higher layers. A MAC layer transport format selection device defines an assignment of higher layer transmission data to parallel data streams based on data characteristics received from higher layers and physical resource information received from the PHY layer. The transport format selection device also generates transport format parameters for each data stream. A multiplexer component multiplexes the transmission data onto the parallel data streams in transport blocks in accordance with the data stream assignment and the respective transport format parameters generated by the transport format selection device and outputs the selectively multiplexed transmission data to the PHY layer for transmission over respective physical resource partitions via one or more antennas for transmitting wireless signals. Preferably, the transport format selection device also generates physical transmission attributes such as modulation and coding rate (MCR), number of subframes per transmission time interval (TTI), duration of TTI, transmission power and hybrid automatic repeat request (HARQ) parameters.

Other objects and advantages will be apparent to those of ordinary skill in the art based upon the following description of presently preferred embodiments of the invention.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention is applicable to wireless communication systems including, but not limited to, Third Generation Partnership Project (3GPP) long term evolution (LTE) and high speed packet access evolution (HSPA+) systems. The present invention may be used in both uplink (UL) and downlink (DL) communications, and therefore may be used in a wireless transmit receive unit (WTRU), also referred to as a user equipment (UE), or a Node B, also referred to as a base station.

In general, a wireless transmit/receive unit (WTRU) includes but is not limited to a user equipment, mobile station, fixed or mobile subscriber unit, pager, cellular telephone, personal digital assistant (PDA), computer, or any other type of device capable of operating in a wireless environment. A base station is a type of WTRU generally designed to provide network services to multiple WTRUs and includes, but is not limited to, a Node-B, site controller, access point or any other type of interfacing device in a wireless environment.

A revised MAC protocol is provided to take into account new attributes and resources introduced by high speed packet access evolution (HSPA+) and long term evolution (LTE) systems including, but not limited to, channelization codes for HSPA+, the number and distribution of subcarriers in the frequency and time domains for LTE, different antenna beams in multi-input multi-output (MIMO) schemes for HSPA+ and LTE, and subsets of antennas in MIMO schemes for HSPA+ and LTE. For HSPA+ and LTE systems employing MIMO, the present invention provides different link adaptation parameters, for example, different modulation and coding schemes, for each of a plurality of parallel data streams. The plurality of parallel data streams are assigned to different physical resource groups of different spatial channels preferably based on the quality of service (QoS) requirements of the data to be transmitted and the channel quality of the channels. Specifically, a method is provided to normalize QoS across parallel data streams when the same QoS is desired, and to realize different QoS requirements for parallel data streams, when, for example, the data streams originate from different radio bearers with different QoS requirements.

Figure 1:
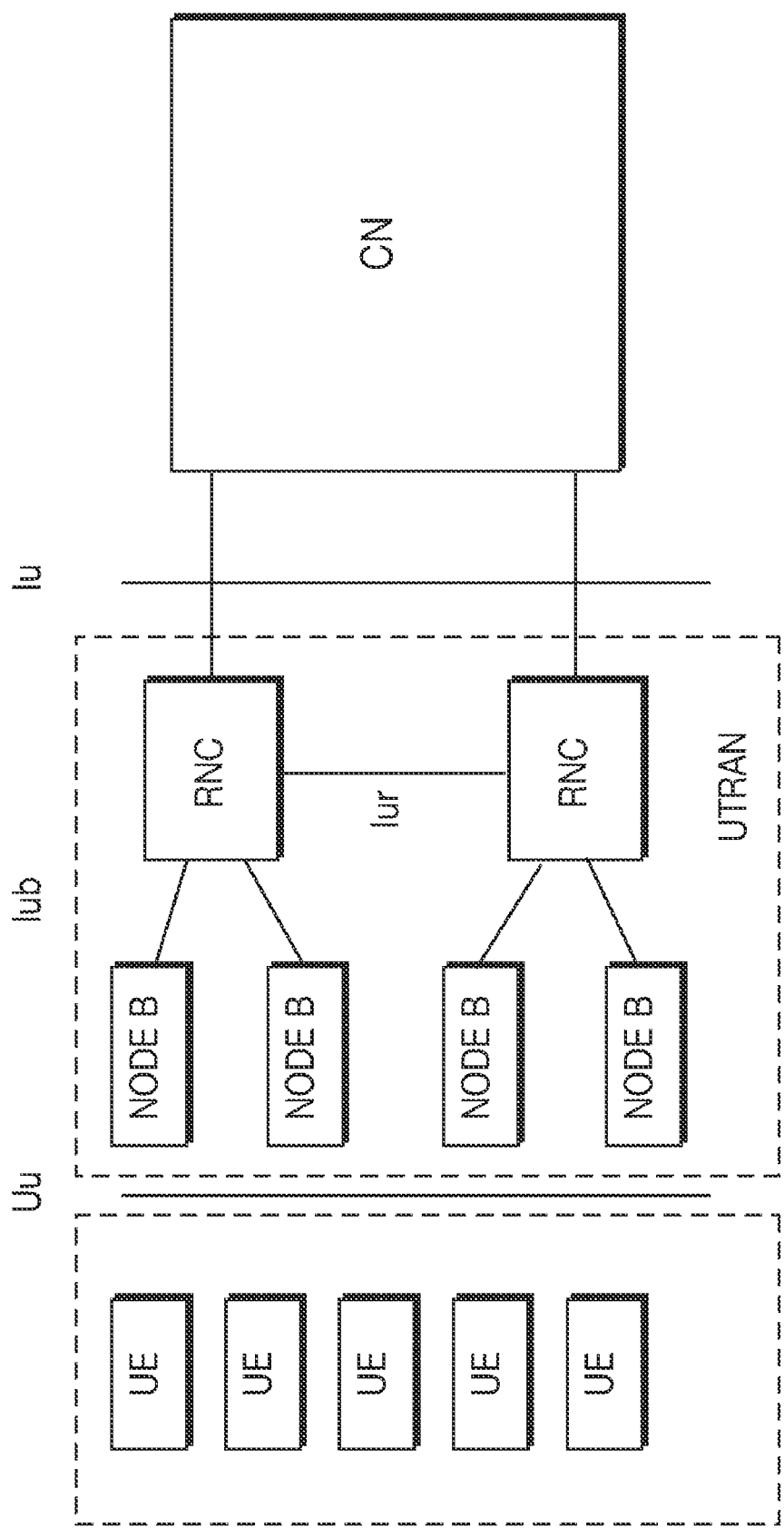
FIG. 1 shows an overview of the system architecture of a conventional UMTS network.
Figure 2:
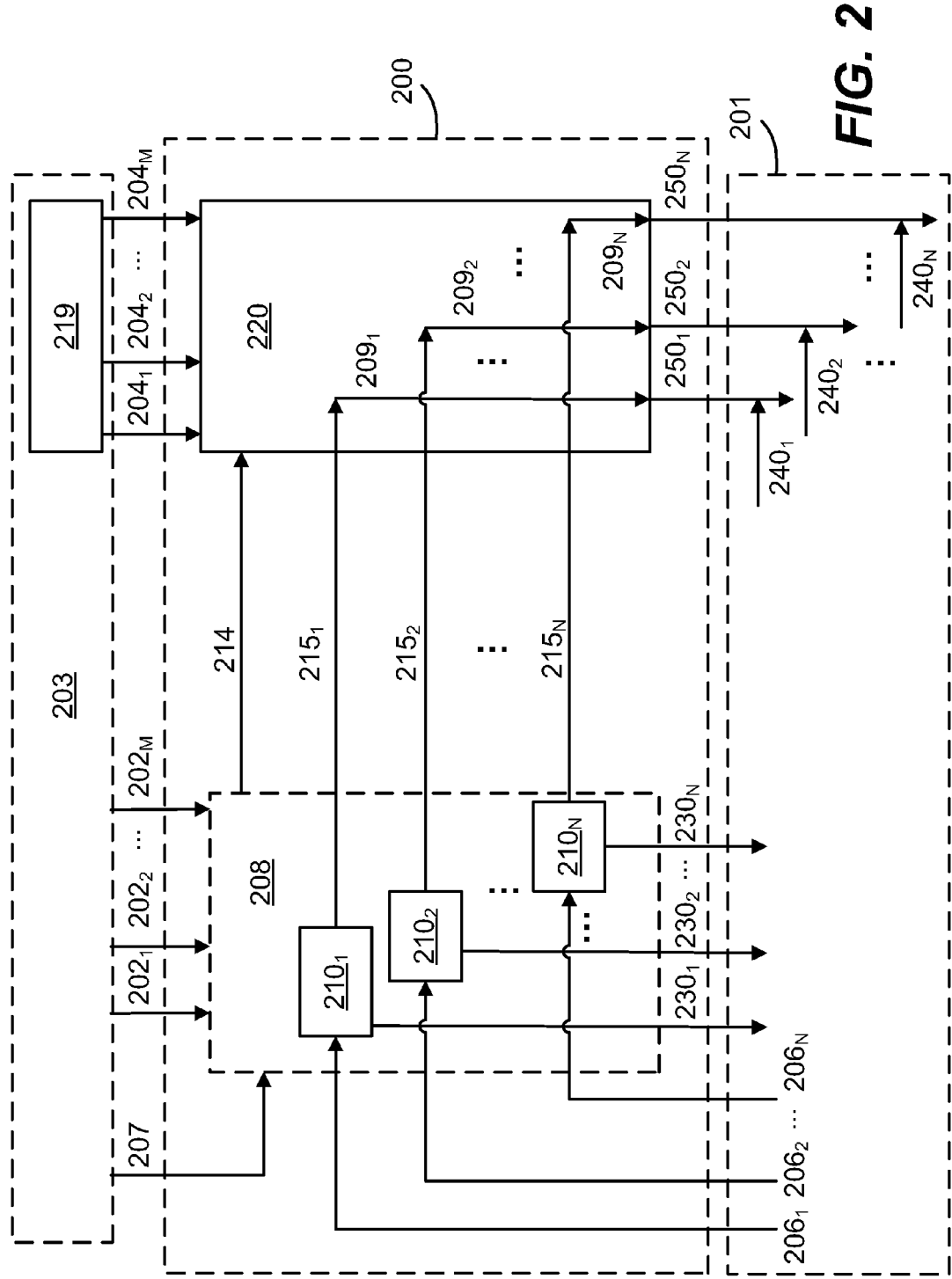
FIG. 2 shows the application of parallel transport format combination (TFC) selection functions each TTI within the medium access (MAC) layer to support the physical layer features of proposed LTE or HSPA+ systems in accordance with the present invention.

FIG. 2 illustrates a preferred embodiment of selected components comprised in a transmitter and/or receiver associated with multiple transport format combination (TFC) selections each TTI in a medium access (MAC) layer processing component 200 for a WTRU configured to operate in LTE or HSPA+ systems in accordance with the present invention. TFC selection is a process that occurs for each active data stream prior to each transmission time interval (TTI) and is involved with deciding how data is to be transmitted.

The medium access (MAC) layer processing component 200 is configured to receive data from one or more radio bearers $204_1$ to $204_M$ via a radio link control protocol (RLC) layer for a given UE-Node B communication link provided by higher layers. The higher layers, including but not limited to the RLC layer, the radio resource control (RRC) layer and layer 3, are represented by higher layer components 203 that exist above the MAC layer component 200. The data of the radio bearers $204_1$ to $204_M$ is preferably buffered in a buffer 219 in a layer above the MAC layer, for example above the RLC layer, until after TFC selections for the current TTI have occurred, at which point the data is multiplexed by data multiplexer component 220 into designated transport blocks, as discussed below.

The MAC layer processing component 200 is also configured to receive quality of service (QoS) requirements and other data characteristics $202_1$ to $202_M$ for each radio bearer. QoS requirements provided by higher layers (i.e. layer 3 or higher) may include, but are not limited to, a number of hybrid automatic repeat request (H-ARQ) retransmissions, a block error rate, a priority, allowed data combinations and/or a power offset. Other data characteristics can include items such as buffer characteristics for each channel of data of the radio bearers.

From the physical (PHY) layer, represented by the physical layer component 201, the MAC layer processing component 200 receives channel characteristics $206_1$ to $206_N$ for each group of available physical resources such as channel quality measurements and dynamic scheduling parameters that are susceptible to change each TTI. A transport format combination (TFC) selection device 208 is provided as part of the MAC layer processing component 200. The TFC selection device 208 is configured to assign the radio bearer data $204_1$ to $204_M$ and the available physical resource partitions based on the information $202_1$ to $202_M$, and 207 communicated from higher layers and the information $206_1$ to $206_N$ communicated from the PHY layer.

Channel characteristics of available physical resources signaled to the MAC layer each TTI from the PHY layer for the purpose of TFC selection may, for example, take the form of a channel quality indicator (CQI) for the channel quality. Subchannels can be provided as subcarriers in LTE, and channelization codes in HSPA+. The present invention takes into account new dynamic transport format (TF) parameters introduced by LTE and HSPA+ that are susceptible to change for each TTI, including, but not limited to, permitted transport block (TB) or TB set sizes, number of subframes, modulation rate, coding rate, time and frequency distribution of subcarriers (for LTE), number of subchannels (i.e. subcarriers or channelization codes), maximum allowed transmission power, antenna beams in MIMO, subset of antennas in MIMO, TTI duration and H-ARQ parameters. These dynamic TF parameters are preferably determined in the TFC selection device 208 prior to each TTI based on corresponding limitations provided by the PHY layer data $206_1$ to $206_N$.

Some TF parameters are considered semi-static because they take more than one TTI to change and are accordingly not dynamically updated each TTI but after multiple TTIs. Examples of semi-static TF parameters include the type of channel coding, and the size of the cyclic redundancy check (CRC). Preferably, semi-static parameters are determined according to signaling information 207 to the transport format combination (TFC) selection device 208 from a higher layer such as, for example, the Radio Resource Control (RRC) layer.

The TFC selection device 208 is configured to assign the radio bearer data $204_1$ to $204_M$ and the available physical resource partitions into corresponding parallel TFC selection functions $210_1$ to $210_N$ that assign the radio bearer data $204_1$ to $204_M$ to respective data streams $209_1$ to $209_N$ and identify respective HARQ processes $230_1$ to $230_N$ to the PHY layer which in turn applies the respective HARQ processes $240_1$ to $240_N$ to the respective data streams. The data streams $209_1$ to $209_N$ may consist of data from one or more logical channels, and may each be derived from a single radio bearer or a plurality of radio bearers. Data of a single radio bearer may be divided and assigned to different data streams determined by the TFC selection device 208. For example, when only one radio bearer is communicating data, that radio bearer's data is preferably divided into streams to efficiently use all of the available physical resource partitions, particularly for UL transmissions.

Typically, the available physical resource partitions will be defined in the information received from the PHY layer $206_1$ to $206_N$. For uplink (UL) transmissions, the TFC selection device may receive explicit partition instructions from RRC layer signaling 207 dictating physical resource partitions and transmission parameters for each physical resource in each partition. Similarly, the signaling from the RRC layer 207 may instruct on partitions that are data flow or radio bearer specific. To the extent permitted, the PHY layer information $206_1$ to $206_N$ can include optional choices in the groupings of physical resources for physical partitions. In such case, the TFC selection device 208 will also select the partitions from allowable partitioning criteria signaled from the PHY layer $206_1$ to $206_N$ and/or the RRC layer 207.

The TFC selection device 208 preferably matches data QoS requirements of the channel data of the radio bearers $204_1$ to $204_M$ to physical channel qualities for available physical resource partitions in defining the data streams $209_1$ to $209_N$. The TFC selection device 208 provides the assignment of the radio bearers $204_1$ to $204_M$ for the data streams $209_1$ to $209_N$ to the multiplexer component 220 via assignment data 214 so that the channel data of the radio bearers $204_1$ to $204_N$ is appropriately directed into the respective assigned data streams $209_1$ to $209_N$. The data streams $209_1$ to $209_N$ are each somewhat analogous to the prior art single CCTrCH or single TrCH data stream, but represent a selected division of the data of the radio bearers for a communication between a UE and Node B which follow independent processing/transmission tracks.

The TFC selection functions $210_1$ to $210_N$ generate transport formats (TFs) or TF sets to provide the desired QoS for the parallel data streams $209_1$ to $209_N$ based on the channel quality parameters of the corresponding physical resource partitions. The TF selection for each selected physical resource partition is provided to the PHY layer as represented by signals $230_1$ to $230_N$. The TFC selection functions $210_1$ to $210_N$ also preferably make available parameter choices for the physical resources of physical resource partitions such as number of subframes, modulation rate, coding rate, time and frequency distribution of subcarriers (for LTE), number of subchannels (i.e. subcarriers or channelization codes), maximum allowed transmission power, antenna beams in MIMO, subset of antennas in MIMO, TTI duration and H-ARQ parameters. These choices will in most instances be limited by the PHY layer. However, the total amount of HARQ resources available may be signaled to the MAC component 200 to permit the TFC selection functions $210_1$ to $210_N$ to assign HARQ processes for the data streams $209_1$ to $209_N$ via signals $230_1$ to $230_N$ to the PHY layer. The HARQ partition assignment is affected by the values of other related parameters, in particular, the values of the modulation and coding scheme (MCS) and TB size. The TFC selection functions $210_1$ to $210_N$ take into account the values of physical layer parameters, preferably MCS and TB size, of each of the physical resource partitions when determining the HARQ partition assignments for the respective data streams $209_1$ to $209_N$. In the more limited case where the PHY layer dictates the HARQ resource partitioning, the MAC component 200 does not select the HARQ processes assigned to the data streams $209_1$ to $209_N$.

The TF selection including the TB size for each data stream $209_1$ to $209_N$ is provided via $215_1$ to $215_N$ to the data multiplexer component 220. The data multiplexer component 220 uses this information to concatenate and segment respective higher layer data streams $209_1$ to $209_N$ into transport blocks (TBs) or TB sets $250_1$ to $250_N$ designated for the respectively assigned physical resource partitions as determined by the TFC selection device 208. The TBs $250_1$ to $250_N$ are preferably provided to the PHY layer for transmission over physical channels starting on a common transmission time interval (TTI) boundary. Preferably, the PHY layer includes one or more antennas for transmitting the TBs via wireless signals.

Preferably, signals $230_1$ to $230_N$ and TBs $250_1$ to $250_N$ are coordinated in the MAC layer processing component 200 and may be combined and signaled together to the PHY layer processor in advance of each TTI boundary.

In one embodiment, the TFC selection functions $210_1$ to $210_N$ generate transport formats (TFs) to normalize the expected QoS provided for two or more of the data stream $209_1$ to $209_N$. This embodiment is desirable when data originates from a radio bearer or set of radio bearers with common QoS requirements to be transmitted in a common TTI.

In another embodiment, the TFC selection functions $210_1$ to $210_N$ generate transport formats (TFs) to differentiate the expected QoS provided to two or more of the data stream $209_1$ to $209_N$. This alternate embodiment is desirable when two or more radio bearer sets providing data for the respective data streams have different QoS requirements, or, when a single radio bearer, for example a voice stream, contains data with different QoS including priority.

Figure 3:
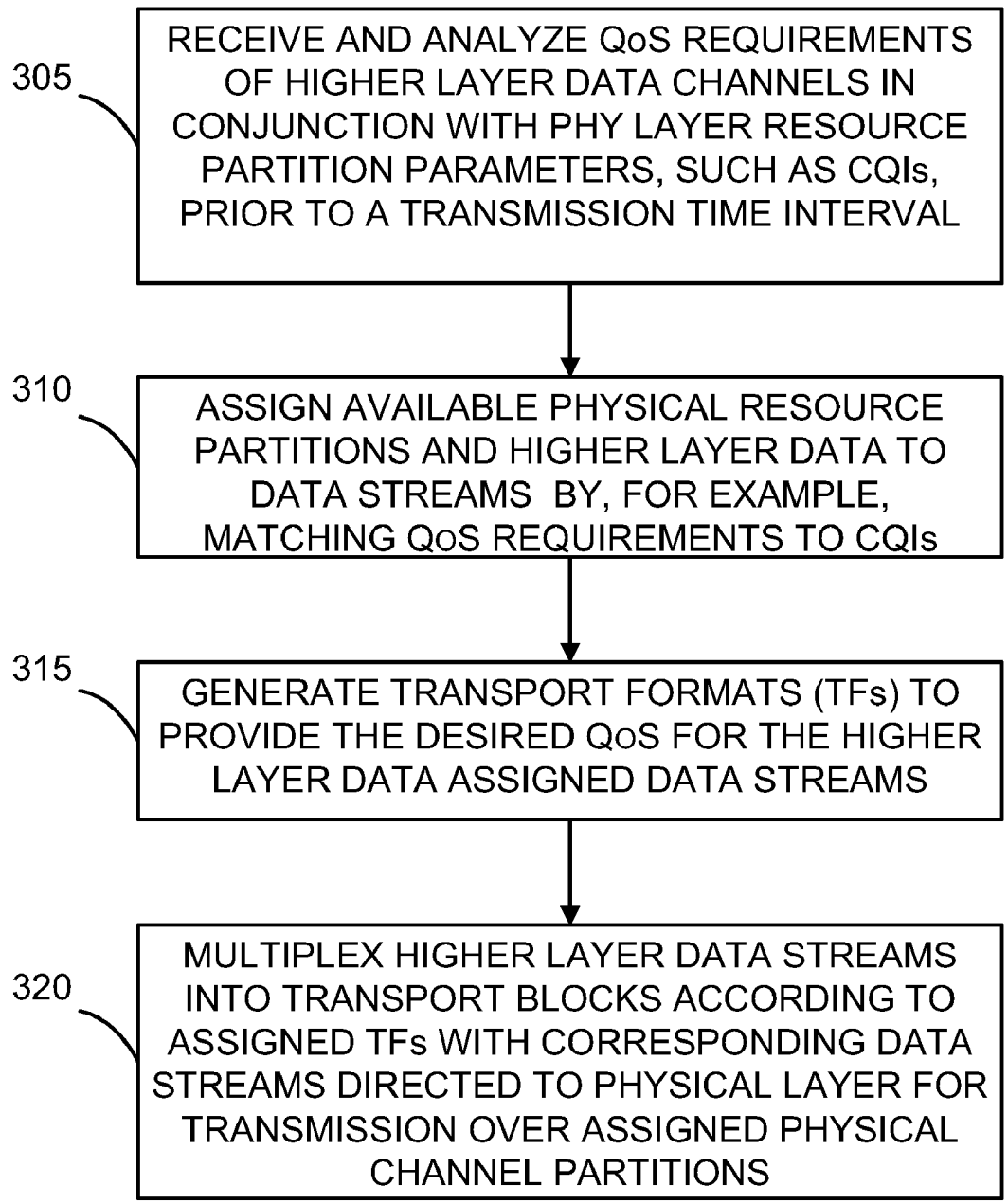
FIG. 3 is a flow diagram for MAC procedure each TTI applying a plurality of TFC selection functions to assign data to available physical resources based on channel quality measurements and quality of service requirements in accordance with the present invention.

As shown in FIG. 3, an example of the basic processing steps 300 undertaken in advance of each TTI boundary with respect to the MAC layer in accordance with the invention includes: buffer analysis 305, physical resource partitioning and data flow assignment 310, transmission attributes determination 315 and data multiplexing 320. As noted above, the present invention readily provides for HARQ process assignment by the MAC component when different HARQs are applicable to the data streams $209_1$ to $209_N$.

In step 305, data, corresponding quality of service (QoS) requirements and possibly other characteristics including physical resource partition requirements for the data, are received from higher layers, for example the radio resource control (RRC) layer and the radio link control (RLC) layer. Parameters, such as channel quality indicators (CQIs) and dynamic scheduling information, are received from the physical (PHY) layer, preferably prior to a transmission time interval (TTI) in which data is to be transmitted. The high level data information is analyzed in comparison with the PHY layer partition information to determine QoS requirements of available higher layer data and available physical resource partitions with associated CQI levels and dynamic scheduling information. In step 310, there is an assignment of available physical resource partitions and parallel data streams derived from the higher layer channel data by, for example, matching QoS requirements to CQIs and dynamic scheduling information. In step 315, transport formats (TFs) or TF sets associated with each data stream and the assigned physical resource partition are generated to provide the desired QoS for the parallel data streams based on the channel quality parameters and dynamic scheduling information of the corresponding physical resource partitions. In association with this step, parameters for the physical resources as permitted by the PHY layer are determined. For example, an assignment of HARQ resources is preferably made. In step 320, the higher layer data is multiplexed (e.g. concatenated and segmented) in accordance with the data stream assignment into transport blocks (TBs) or TB sets according to the associated TFs for each data stream activating on the current TTI boundary and provided to the PHY layer for transmission over physical channels that preferably start on a common transmission time interval (TTI) boundary. Further explanation of each step in general is provided below.

Buffer Analysis

QoS requirements $202_1$ to $202_M$, such as data rate, block error rate, transmit power offset, priority and/or latency requirements, for radio bearer data $204_1$ to $204_M$ are evaluated by the TFC selection device 208. In general, QoS requirements are provided by the higher layers so that the TFC selection functions may determine the permitted data combinations for the data multiplexing step for the current TTI(s). When multiple logical channels or higher layer data flows are present in the data $204_1$ to $204_M$, the QoS requirements may further include buffer occupancy information for each logical channel, priority for each logical channel or data flow or indication of the highest priority data flow, packet sizes for each data flow, and allowed combinations of data flows. According to the QoS requirements $202_1$ to $202_M$, the TFC selection device 208 preferably determines the allowed data multiplexing combinations for data channels $204_1$ to $204_M$, with available data for transmission, sorted by transmission priority. The amount of available data for each allowed multiplexing combination, a corresponding number of HARQ retransmissions, a power offset and/or other QoS related parameters associated with each data multiplexing combination are also preferably determined.

Physical Resource Partitioning and Data Flow Assignment

The available physical resources, as provided by the physical layer along with channel quality measurements and dynamic scheduling information $206_1$ to $206_N$, are preferably partitioned into subchannel partitions based on the QoS and partitioning requirements of higher layer data and channel parameters provided by the physical (PHY) layer including, but not limited to, channel quality indicator (CQI) reports, dynamic scheduling information, and available HARQ resources. The available subchannel partitions are determined so that they may be assigned data streams for the individual transmission of multiplexed data combinations belonging to those data streams.

According to a preferred embodiment, a CQI report is generated for each available subchannel (subcarriers in the time and frequency domains or channelization-code in the code domain) measured based on pilot channels at the physical layer. In downlink (DL) communications, not all the available subchannels are necessarily used for data transmission each TTI. A threshold indicating the desired limit of acceptable transmission performance is defined such that only those subchannels with corresponding CQI values higher than the threshold are used for transmission. Accordingly, only the qualifying subchannels are selected by the TFC selection functions $210_1$ to $210_N$ for inclusion in assigned partitions. This is preferably accomplished by CQI based scheduling in a Node B.

For UL communications, a Node B scheduler may provide to a user equipment (UE) information on the allocated physical (PHY) resources, including, but not limited to, the available subchannels, antenna beams, maximum allowed uplink (UL) power, and the modulation and coding scheme (MCS) limitation and/or channel quality indicator (CQI) for each of the allocated subchannels. Preferably, such information is provided for each physical channel available for the UL transmission. The PHY resource allocation may change or remain unchanged for the subsequent scheduling grants. This may be determined by identifying the relative difference in subsequent scheduling grants. A UE may not be provided with enough physical resources to selectively choose a subset set of the available subchannels based on a threshold value. In this case, the TFC selection device 208 may preferably make use of all available subchannels regardless of CQI. UL channels offering CQI greater than a threshold may be identified in the scheduling grant. However, if the grant is valid over multiple TTIs, the CQI of individually granted subchannels may vary over time. The TFC selection functions $210_1$ to $210_N$ preferably adjust the modulation and coding set (MCS), TB size, transmission power and/or HARQ retransmissions for each subchannel or sets of subchannels assigned to a particular physical resource partition, according to the transmission attributes determination step explained below. The TFC selection functions $210_1$ to $210_N$ preferably segregate data flows between subchannels or sets of subchannels assigned to a particular physical resource partition offering CQI levels that better accommodate the QoS requirement of the data flows $209_1$ to $209_N$ mapped to the physical resource partition.

Parallel data streams derived from the higher layer data $204_1$ to $204_M$ are assigned to the TFC selection functions $210_1$ to $210_N$ in connection with respective available physical resource partitions. The data stream assignments are preferably generated according to common QoS attributes of various channels among the higher layer data $204_1$ to $204_M$, for example, priority. TFC selection functions $210_1$ to $210_N$ preferably assign data streams to available physical resource partitions by matching CQI levels and dynamic scheduling information to QoS requirements as best as possible for each set of data flows and associated physical resource partitions.

The parallel data streams may derive from one or more radio bearers with common or different QoS requirements; accordingly, two or more of the data streams $209_1$ to $209_N$ may have compatible QoS requirements. By way of example, voice over internet protocol (VoIP) and internet browsing data requiring non-compatible QoS can be assigned to different data streams $209_1$ to $209_N$ or sets of data streams and mapped to separate physical resource partitions to best match the different priority and delay requirements.

Transmission Attributes Determination

The TFC selection functions $210_1$ to $210_N$ preferably operate in parallel to determine the TF and physical transmission attributes to be applied to each physical resource partition to best satisfy the QoS requirements of the corresponding data streams $209_1$ to $209_N$. This determination is preferably based on the CQIs and dynamic scheduling information of each subchannel partition and the QoS requirements of the corresponding data streams $209_1$ to $209_N$. The physical attributes include the modulation and coding rate, number of subframes per TTI, transmission power and HARQ retransmissions which may be adjusted to meet the QoS requirement of each data flow and possibly according to the CQI of particular subchannels. HARQ processes are preferably assigned to physical resource partitions dynamically, as explained in more detail below.

More than one physical resource partition may be associated with data streams with common QoS requirements. In this case, if the CQIs vary across individual physical resource partitions, the transport format parameters, including modulation and coding set (MCS), TB size, TTI length, transmission power and HARQ parameters, are adjusted to normalize QoS across the subchannel partitions. In other words, different parameters may be assigned for each physical resource partition to normalize the QoS over the corresponding data streams which may be any subset of the data streams $209_1$ to $209_N$. Some TF attributes may be adjusted relative to each other if they affect the same QoS attributes, for example in the case of MCS and transmission power both affecting the expected block error rate.

Once the coding, modulation and TTI length have been associated with the physical resource partitions, transport blocks TBs (or, equivalently, TB sets) are assigned. In particular, the number of data bits that can be multiplexed into each TB for each subchannel partition is preferably determined based on the other TF parameters. There may be several TBs with uniquely defined sizes associated with different physical resource partitions and HARQ processes. In the case dynamic HARQ resource partitioning is allowed, the sum of the subchannel set transmission capabilities may not exceed the total available HARQ resources. When dynamic HARQ resource partitioning is not allowed, the selected TF may not exceed the available resources for each associated HARQ process.

The TBs $250_1$ to $250_N$ are provided to the physical layer, along with associated TF attributes $230_1$ to $230_N$, for transmission over physical channels.

HARQ Assignment

In accordance with a preferred embodiment, HARQ resources are dynamically distributed over the physical resource partitions and their associated TBs (or, equivalently, TB sets) such that multiple HARQ processes may be assigned prior to each TTI. This is preferred over statically configured HARQ process resources proposed by the prior art because when static HARQ process resources are applied, physical resource partitions are restricted to match the HARQ resources associated with the physical resource partition.

Dynamic distribution of HARQ resources allows far greater flexibility during physical resource partitioning since the total HARQ resources can be divided dynamically on an as-needed basis among the data multiplexed onto each physical resource partition. Therefore, the partitioning of physical resources is not restricted by static resources of the associated HARQ process. Additionally, when data of one higher layer radio bearer is distributed across several physical resource partitions offering different channel quality, there is far greater flexibility in choosing the size of each TB and the MCS associated with the physical resource partitions to accommodate the desired QoS.

Each TB associated with one or more subchannel sets is assigned to an available HARQ process. If dynamic HARQ resource partitioning is allowed, the TB size and MCS assigned to the TB are preferably used to determine a soft memory requirement, which is then used to identify to the transmitter and receiver the required HARQ resources. For example, a transport format combination indicator (TFCI) or transport format and resource indicator (TFRI) and knowledge of the chosen MCS at the receiver are typically sufficient for a receiver to dynamically reserve HARQ memory resources on a TTI basis. In synchronous operation the retransmissions are known. In asynchronous operation, HARQ process identities are used to indicate retransmissions. Preferably when retransmissions occur, the HARQ resources are not dynamically adjusted for the retransmissions because the resource requirements do not change from the initial transmission.

A HARQ process $240_1$ to $240_N$ is assigned to each TB and its associated physical resource partition. Information $230_1$ to $230_N$ including, but not limited to, the MCS, subframes, TTI, subcarriers or channelization-codes, antenna (in MIMO), antenna power, and maximum number of transmissions, are then given to HARQ process for transmission. The HARQ processes $240_1$ to $240_N$ will then indicate its availability upon reception of a successful delivery acknowledgement, or upon exceeding its maximum number of retransmissions.

Data Multiplexing

The data multiplexer 220 multiplexes the higher layer data 204 according to data flow assignment information 214 and TF attributes $215_1$ to $215_N$ as provided by the TFC selection functions $210_1$ to $210_N$. Data blocks for each data flow are multiplexed into the previously determined TB sizes associated. Knowledge of the physical resource partitions to which the data flows $209_1$ to $209_N$ will be directed is not required for multiplexing; only the TB sizes and mapping of logical channels $204_1$ to $204_M$ to data flows $209_1$ to $209_N$ are needed. Preferably, multiplexing of logical channels $204_1$ to $204_M$ into TB's assigned to data streams $209_1$ to $209_N$ is done in order of priority of the logical channels $204_1$ to $204_M$.

If there is less available data than the TB size or the multiplexing block size does not exactly fit, the TB may be padded accordingly. However, the TFC selection processes $210_1$ and $210_N$ preferably eliminates the need for padding in most instances. If the available data for transmission exceeds the TB size and more than one TB has been determined for the set of associated data flows, the blocks from the associated data flows are distributed across the TBs. Within each TB, MAC header information specifies how data flows have been multiplexed within the TB. This information uniquely identifies how data from different flows have been multiplexed within a common TB, and how data from flows have been distributed across TBs.

The features of the present invention may be incorporated into an integrated circuit (IC) or be configured in a circuit comprising a multitude of interconnecting components.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for in use in a wireless transmit receive unit (WTRU), user equipment, terminal, base station, radio network controller, or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of processing data comprising:
a data multiplexer component in a medium access control (MAC) layer processing component receiving data;
a radio resource attribute selection device in the MAC layer processing component receiving quality of service (QoS) requirements, available resource partitions and resource partition parameters associated with a plurality of data channels;
normalizing expected QoS requirements across at least two of the available resource partitions;
assigning the available resource partitions and the data to parallel data streams;
the radio resource attribute selection device generating corresponding resource allocations for each of the parallel data streams according to the expected QoS;
the data multiplexer component multiplexing the data assigned to the parallel data streams into transport blocks (TBs) according to the corresponding resource allocations; and
a physical (PHY) layer component selectively transmitting the TBs over the assigned resource partitions.

2. The method of claim 1 wherein the transmission of the TBs is performed during a transmission time interval (TTI).

3. The method of claim 1 wherein the data is multiplexed onto the parallel data streams starting on a common transmission time interval (TTI) boundary.

4. The method of claim 1 wherein the generating of resource allocations differentiates the expected QoS achieved by the parallel data streams containing data with different QoS requirements.

5. The method of claim 1 wherein the parallel data streams include a plurality of logical channels and wherein the assignment selectively distributes data of each logical channel to one of the parallel data streams.

6. The method of claim 1 where the parallel data streams include a single logical channel wherein assignment to data streams selectively distributes data of the single logical channel among the parallel data streams.

7. The method of claim 1 further comprising:
generating transmission attributes for each of the parallel data streams based upon a combination of data characteristics and the available resource partitions; and
controlling subsequent transmission of data in data streams over the resource partitions using the generated resource allocations.

8. The method of claim 7 wherein the generation of resource allocations includes generating modulation type and coding rate, transport block sizes, transmission time interval (TTI) length, transmission power, hybrid automatic repeat request (HARQ) parameters, and subcarriers.

9. The method of claim 7 wherein the generation of resource allocations comprises generating a hybrid automatic repeat request (HARQ) process assignment for each of the parallel data streams according to the generated resource allocations associated with each of the parallel data streams and corresponding transport blocks in a common transmission time interval (TTI).

10. The method of claim 7 wherein the generation of resource allocations includes at least one of the following attributes: modulation type and coding rate, number of subframes per transmission time interval (TTI), duration of TTI, transmission power, hybrid automatic repeat request (HARQ) parameters, and subcarriers.

11. The method of claim 7 wherein the generation of resource allocations includes generating hybrid automatic repeat request (HARQ) parameters based on available information of total HARQ resources.

12. The method of claim 7 wherein the subsequent transmission of data is made in transmission time intervals (TTIs) during each transmission time interval (TTI).

13. A wireless transmit receive unit (WTRU) configured to process data, the WTRU comprising:
a medium access control (MAC) layer processing component comprising a data multiplexer component and a radio resource attribute selection device, the MAC layer processing component being configured to:
receive data using the data multiplexer component;
receive quality of service (QoS) requirements, available resource partitions, and resource partition parameters associated with a plurality of data channels using the radio resource attribute selection device;
normalize expected QoS requirements across at least two of the available resource partitions;
assign the available resource partitions and the data to parallel data streams;
generate corresponding resource allocations for each of the parallel data streams according to the expected QoS using the radio resource attribute selection device;
multiplex the data assigned to the parallel data streams into transport blocks (TBs) according to the corresponding resource allocations using the data multiplexer component; and
a physical (PHY) layer component coupled to the MAC layer processing component, the PHY layer component configured to selectively transmit the TBs over the assigned resource partitions.

14. The WTRU of claim 13 wherein the transmission of TBs is performed during a transmission time interval (TTI).

15. The WTRU of claim 13 wherein the MAC layer processing component multiplexes the data onto parallel data streams starting on a common transmission time interval (TTI) boundary.

16. The WTRU of claim 13 wherein the MAC layer processing component is configured to generate resource allocations that differentiate the expected QoS achieved by the parallel data streams containing data with different QoS requirements.

17. The WTRU of claim 13 where the data includes a plurality of logical channels wherein the MAC layer processing component is configured to assign data selectively by distributing data of each logical channel to one of the parallel data streams.

18. The WTRU of claim 13 where the transmission data includes a single logical channel wherein the MAC layer processing component is configured to assign data selectively by distributing data of the single logical channel among the parallel data streams.

19. The WTRU of claim 13 wherein the MAC layer processing component is further configured to:
generate transmission attributes for each of the parallel data streams based upon a combination of the data characteristics and the available resource partitions; and
control subsequent transmission of data in data streams over the resource partitions using the generated transmission attributes.

20. The WTRU of claim 19 wherein the MAC layer processing component is configured to generate resource allocations that include modulation type and coding rate, transport block sizes, transmission time interval (TTI) length, transmission power, hybrid automatic repeat request (HARQ) parameters, and subcarriers.

21. The WTRU of claim 19 wherein the MAC layer processing component is configured to generate resource allocations that include a hybrid automatic repeat request (HARQ) process assignment for each of the parallel data streams according to generated resource allocations associated with each of the parallel data stream.

22. The WTRU of claim 19 wherein the MAC layer processing component is configured to generate resource allocations that include at least one of the following attributes: modulation type and coding rate, number of subframes per transmission time interval (TTI), duration of TTI, transmission power, hybrid automatic repeat request (HARQ) parameters, and subcarriers.

23. The WTRU of claim 19 wherein the MAC layer processing component is configured to generate resource allocations that include hybrid automatic repeat request (HARQ) parameters based on available information of total HARQ resources.

24. The WTRU of claim 19 wherein the subsequent transmission of data is made in transmission time intervals (TTIs) during each transmission time interval (TTI).

25. The WTRU of claim 19 wherein the subsequent transmission of data is made in transmission time intervals (TTIs) within a predefined timeframe format wherein the MAC layer processing component is configured to multiplex the data onto parallel data streams starting on a common transmission time interval (TTI) boundary.

26. The WTRU of claim 19 wherein the MAC layer processing component is further configured to partition available resources and transmit the multiplexed data based on physical transmission attributes.

* * * * *